Aug. 4, 1953

J. M. PESTARINI 2,648,039

POWER SYSTEM FOR A PLURALITY OF MOTORS

Filed Aug. 29, 1947

INVENTOR.

Joseph Maximus Pestarini

Patented Aug. 4, 1953

2,648,039

UNITED STATES PATENT OFFICE 2,648,039

POWER SYSTEM FOR A PLURALITY OF MOTORS

Joseph Maximus Pestarini, New York, N. Y.

Application August 29, 1947, Serial No. 771,295

1 Claim. (Cl. 318—140)

This invention relates to power systems for a plurality of motors.

An object of this invention is to provide a power system for controlling the operation of a set of mechanically coupled motors, in an improved manner.

Another object of this invention is to provide a power system for controlling the operation of a plurality of sets of motors, each set of motors being mechanically coupled together and each set of motors being adapted to operate independently.

A further object of this invention is to provide in a power system of the character described, power transforming means of the metadyne type with is adapted to distribute power to a set of mechanically coupled motors in accordance with the requirements of the individual motors.

Still another object of this invention is to provide in a power system of the character described, power transforming means of the metadyne type, wherein the brushes thereof are located in a predetermined manner whereby power is transferred to motors connected to selected combinations of brushes in accordance with the power requirements of the individual motors, thereby allowing the metadyne construction to be reduced to a minimum commensurate with the power requirements of the motors.

The metadyne hereinafter referred to, is a direct current machine having more than two brushes per cycle, the flux created by the current traversing the armature through a pair of brushes inducing an electromotive force between another pair of brushes of the same cycle. Such a machine is more fully described in Patents No. 2,055,240; 1,987,417; 2,038,380; 2,049,389; and 2,079,465.

Figures 1, 4:
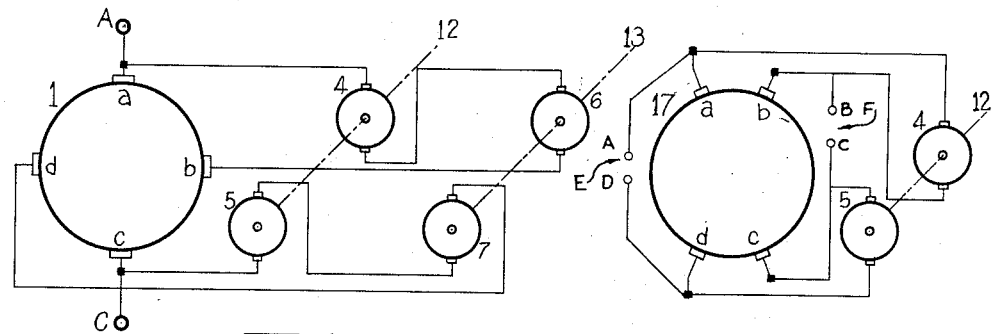
Figure 3:
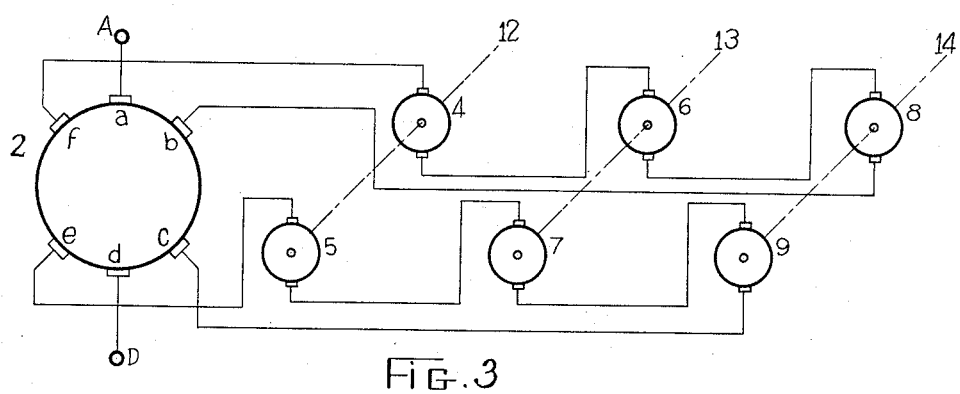
Figure 2:
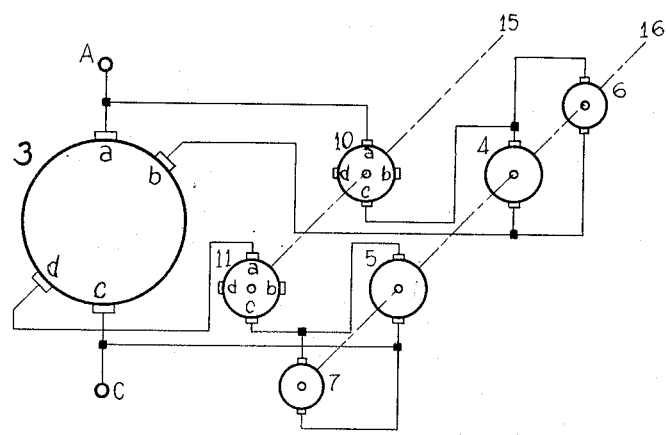

In the drawings, Fig. 1 shows a power system including a metadyne connected to a plurality of sets of mechanically coupled dynamos; Fig. 2 shows a modified form of the system shown in Fig. 1; Fig. 3 shows a metadyne having six brushes per cycle and its connections to a plurality of sets of mechanically coupled dynamos and Fig. 4 shows a metadyne connected to a plurality of current sources and to a set of coupled dynamos.

In Fig. 1, the transformer metadyne 1 includes a pair of primary brushes $a$, $c$ which are displaced 180 electrical degrees from one another and connected to a source of direct current applied to terminals A, C. The metadyne 1 further includes a pair of secondary brushes $b$, $d$ which are also displaced 180 electrical degrees from each other, the pair of brushes being displaced 90 electrical degrees with respect to the primary brushes $a$, $c$.

The system shown in Fig. 1 further includes consumers in the form of a first pair of mechanically coupled dynamos 4, 5 and a second pair of mechanically coupled dynamos 6, 7, through shafts 12 and 13, respectively. The dynamos 4, 6 are connected in series with brushes $a$, $b$, while dynamos 5, 7 are connected in series with brushes $c$, $d$. The dynamos 4 and 5 are identical and the dynamos 6, and 7 are identical. Accordingly, the total electromotive force induced by dynamos 4, 6 at any moment equals the electromotive force induced by dynamos 5, 7, even if the shaft 12 rotates at a different speed from shaft 13.

It will be apparent that dynamos 4, 6 forming one group of consumers, are connected to brushes which are symmetrically disposed with relation to the brushes to which a second group of consumers are connected, such second group including dynamos 5, 7. Accordingly, the electromotive force induced between brushes $a$, $b$ is identical with that induced between brushes $c$, $d$. Since the current of each group of consumers traverses the armature of the metadyne 1 through a pair of brushes displaced 90 electrical degrees from each other, the losses are relatively small and the size of the metadyne may be reduced to a minimum.

There are cases where the maximum electromotive force required by each group of consumers is very small compared to the electromotive force of the direct current source which is in circuit with the primary brushes of the metadyne. The arrangement shown in Fig. 2, may be used in such case. Here, the metadyne 3 includes a pair of primary brushes $a$, $c$ which are displaced 180 electrical degrees from each other and are connected to a direct current source through terminals A, C. The metadyne 3 further includes a pair of secondary brushes $b$, $d$ which are also displaced 180 electrical degrees from each other. However, the secondary brushes are displaced relative to the primary brushes by an angle less than 90 electrical degrees. Such an arrangement substantially reduces losses since the secondary current traverses a short segment of the metadyne armature.

A group of consumers is connected to brushes $a$, $b$ of the metadyne 3, such group including a metadyne 10 connected through its primary brushes $a$, $c$ in series with a pair of parallel connected dynamos 4, 6. A second group of consumers is connected to the brushes $c$, $d$ of the metadyne 3, such group including a metadyne 11 connected through its primary brushes $a$, $c$ in series with a pair of parallel connected dynamos 5, 7. The metadynes 10, 11 are coupled by a shaft 15, while the dynamos 4, 5, 6 and 7 are coupled by a shaft 17. The machines coupled to the respective shafts are thus adapted to operate independently. The metadynes 10, 11 are identical and the respective pairs of dynamos 4, 6; 5, 7, are also identical. Although the metadyne and pair of dynamos in each group of consumers may have different individual power requirements, the total electromotive force induced at the brushes $a$, $b$; $c$, $d$ of the metadyne 3, by the respective groups of consumers, is the same.

As shown in Fig. 3, the metadyne 2 includes six brushes per cycle. The brushes are arranged in pairs, wherein the brushes of a pair are displaced 180 electrical degrees from one another. Furthermore, the pairs of brushes are symmetrically arranged relative to one another. Thus, the brushes $b$, $e$ bear the same angular relation to brushes $a$, $d$, as brushes $c$, $f$ bear to brushes $a$, $d$. The brushes $a$, $d$, which may be referred to as primary brushes, are connected to a direct current source through terminals A, C.

A first group of consumers including series connected dynamos 4, 6 and 8, is connected to brushes $b$, $f$ of the metadyne while a second group of consumers including dynamos 5, 7 and 9, is connected to brushes $c$, $e$ of the metadyne. The pairs of dynamos 4, 5; 6, 7; and 8, 9, are respectively coupled by shafts 12, 13 and 14, thus allowing independent rotational speeds of the respective shafts. The total electromotive force induced by each group of consumers at the interconnected brushes of the metadyne, will be the same. Here again, the symmetrical relation of the brushes connected to the consumers, with respect to the primary brushes, allows the same electromotive force to be induced between brushes $b$, $f$; $c$, $e$, of the metadyne.

The angular relation of the consumer connected or secondary brushes may be varied, providing the relationship to the primary brushes, is such that the electromotive force induced at brushes $b$, $f$ is the same as at brushes $c$, $e$, at any given moment. The number of machines in each group of consumers may be reduced to one, provided the single machines operate in a manner to induce the same electromotive force at the connected brushes at a given moment.

A system embodying the invention may be arranged to operate with a plurality of direct current sources, as shown in Fig. 4. Here, the metadyne 17 includes a pair of brushes $a$, $c$ displaced 180 electrical degrees from each other and a second pair of brushes $b$, $d$, similarly displaced from one another. Brushes $a$, $d$ are connected to one direct current source E through terminals A, D, while brushes $c$, $b$ are connected to a second direct current source F independent of the first direct current source, through terminals B, C.

A pair of similar dynamos 4, 5 are coupled to a shaft 12. Dynamo 4 is connected to brushes $a$, $b$ while dynamo 5 is connected to brushes $c$, $d$. With the brushes symmetrically arranged, the electromotive force induced between brushes $a$, $b$ and between brushes $c$, $d$, is the same. Similarly, the electromotive force required by each of the dynamos 4, 5, at any given moment, is the same.

With brushes $a$, $c$ displaced from brushes $b$, $d$, by an angle less than 90 electrical degrees, as shown in Fig. 4, the losses in the metadyne 17 are reduced to a minimum and allowing efficient metadyne construction. It is understood that the groups of consumers may have any number of machines, suitably interconnected, providing the total input voltage of each group is the same. Since the metadyne is adapted to operate interchangeably, the direct current sources may receive energy from the consumers as well as supply energy to them.

It is understood that other arrangements may embody the instant invention and that all matter herein set forth or shown in the accompanying drawing is to be deemed illustrative and not of limiting significance.

What I claim is:

A power system for at least one pair of motors adapted to rotate at the same speed, comprising a pair of independent sources of current, a dynamo electric machine of the metadyne type comprising an armature provided with a set of diametrically opposed brushes and a second set of diametrically opposed brushes, said brush sets being displaced relative to each other, each of said brush sets being connected to one of said sources of current, one of said motors being connected to a brush in each of said sets of brushes, the other of said motors being connected to the other brush in each of said sets of brushes, said interconnected brushes being adapted to induce the same electromotive force therebetween.

JOSEPH MAXIMUS PESTARINI.

References Cited in the file of this patent

UNITED STATES PATENTS

| Number | Name | Date |
|---|---|---|
| 2,049,388 | Pestarini | July 28, 1936 |

FOREIGN PATENTS

| Number | Country | Date |
|---|---|---|
| 400,416 | Great Britain | Oct. 26, 1933 |